United States Patent
Cao et al.

(10) Patent No.: US 8,681,639 B2
(45) Date of Patent: Mar. 25, 2014

(54) METHOD AND SYSTEM FOR FINDING

(75) Inventors: Rong Zeng Cao, Beijing (CN); Shun Jiang, Beijing (CN); Juhnyoung Lee, Yorktown Heights, NY (US); Feng Li, Beijing (CN); Thomas Li, Beijing (CN); Feng Chun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 12/977,157

(22) Filed: Dec. 23, 2010

(65) Prior Publication Data
US 2011/0158107 A1 Jun. 30, 2011

(30) Foreign Application Priority Data
Dec. 28, 2009 (CN) .......................... 2009 1 0265278

(51) Int. Cl.
| | | |
|---|---|---|
| *H04L 12/26* | (2006.01) | |
| *H04L 1/00* | (2006.01) | |
| *H04J 1/16* | (2006.01) | |
| *H04J 3/14* | (2006.01) | |
| *G01R 31/08* | (2006.01) | |
| *G06F 11/00* | (2006.01) | |
| *G08C 15/00* | (2006.01) | |
| *H04L 12/28* | (2006.01) | |
| *H04L 12/56* | (2011.01) | |

(52) U.S. Cl.
USPC .......................................... 370/242; 370/392

(58) Field of Classification Search
USPC ........................................ 370/242, 392, 401
See application file for complete search history.

(56) References Cited

U.S. PATENT DOCUMENTS

| | | | |
|---|---|---|---|
| 2005/0068954 A1 | 3/2005 | Liu et al. | |
| 2008/0080507 A1* | 4/2008 | Swallow et al. | 370/392 |
| 2008/0080807 A1 | 4/2008 | Kim et al. | |

FOREIGN PATENT DOCUMENTS

| | | |
|---|---|---|
| CN | 101211282 A | 7/2008 |
| WO | WO-2009010827 A2 | 1/2009 |

OTHER PUBLICATIONS

G.C. Barker, Application of Bayesian Belief NetWork models to foodsafety science, Bayesian Statistics and Quality Modelling . . . , 2004, pp. 117-128, vol. 3.
Zhang Xiaoshuan et al., Research on the Conceptualization model for Traceability System of Meat . . . , WSEAS Transactions on Information Science., Jul. 2009, 1083-1093, vol. 6-7.
Lucia Lo Bello et al., Modelling traceability systems in food manufacturing chains, Dipartimento di Ingegneria Informatica..—Universita degli studi di Catania. Italy.
Chinese Office Action: CN Application No. 200910265278.0; Date Mailed: Apr. 7, 2013, pp. 1-6.

* cited by examiner

*Primary Examiner* — Noel Beharry
*Assistant Examiner* — Farhad Ali
(74) *Attorney, Agent, or Firm* — Cantor Colburn LLP (57) ABSTRACT

A method and system for finding a source failure node in a traceable network. The method includes: determining a possible source failure node according to a leaf node that has an exception, wherein the possible source failure node is a node that is most likely to cause the exception; selecting a target node to receive an investigation result corresponding to the target node, wherein the investigation result indicates whether the target node has the same exception; receiving the investigation result corresponding to the target node and updating the traceable network according to the investigation result; and returning to the step of determining a possible source failure node, if it can not be verified according to the updated traceable network that the possible source failure node is the source failure node causing the exception.

14 Claims, 4 Drawing Sheets

METHOD AND SYSTEM FOR FINDING

CROSS REFERENCE TO RELATED APPLICATION

This invention claims priority under 35 U.S.C. 119 from Chinese Application 200910265278.0, filed Dec. 28, 2009, the entire contents of which are herein incorporated by reference.

BACKGROUND OF THE INVENTION

1. Field of the Invention

The present invention relates to an information process field, and more particularly, to a method and system for finding a source failure node in a traceable network.

2. Description of Related Art

Figure 1:
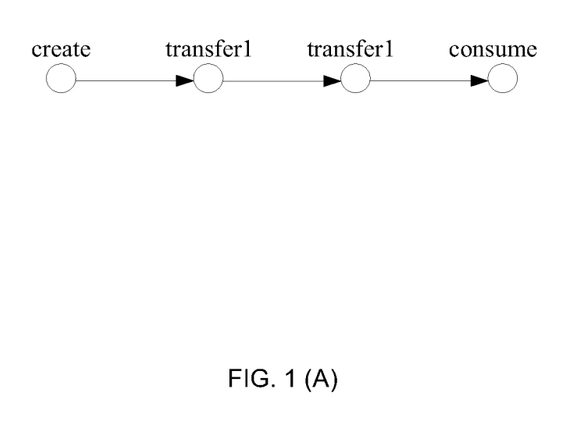

In a network in which information or material flows in one direction, the information or material can be traced with a traceable network. For example, a traceable network for information flow can be constructed with technologies such as electronic signatures, electronic seals, etc; and a traceable network for material flow can be constructed with technology such as RFID's. The information and material can be collectively referred to as "product." An ideal traceable network records every stage experienced from the creation of the product to the consumption of the product, and every stage corresponds to one node of the traceable network, in which a stage or node adjacent to the product consumption is referred to as downstream, and a stage or node away from the product consumption is referred to as an upstream stage or upstream node. FIG. 1 (A) is a simple traceable network, which includes only one creation stage and two transfer stages. For a product that includes a plurality of components, its corresponding traceable network may include many nodes, because not only will the product at least experience creation and transfer stages, but the respective components contained in the product will also experience creation and transfer stages, and these components can be constructed by smaller components. FIG. 1 (B) is an example of a traceable network of a product that includes a plurality of components.

The traceable networks corresponding to different products may overlap with each other, for example, there can be various products including a certain component, or a certain stage that will affect a plurality of components. As such, a combination of traceable networks of various products becomes a more complex traceable network. FIG. 1 (C) shows such a combined traceable network in which the more right a node is, the more downstream a node it is. As shown in FIG. 1 (C), an upstream node may affect a plurality of downstream nodes.

If some stage in the traceable network has an exception, for example, a quality problem is found in the material network or data is found to be corrupted in the information network, an obvious idea is that all downstream nodes of the stage having the exception will be affected by that exception. The problem is that it generally cannot be determined whether the exception is caused by a failure of that stage itself or caused by a failure of the upstream nodes of that stage. In the latter case, all downstream nodes of that upstream stage will be affected. If an exception occurs at product consumption, that is, an exception occurs at a most downstream stage of the traceable network or at a leaf node of the traceable network, then it will be more difficult to determine the affected range of that exception. Thus, it is necessary to find the source failure node according to information provided in the traceable network. The source failure node refers to such a failure point that all of its upstream nodes do not have the failure, but all of its downstream nodes do. The scope affected by that failure can be determined once the source failure node is found, thereby taking further processing.

BRIEF SUMMARY OF THE INVENTION

To overcome these deficiencies, the present invention provides a method for finding a source failure node in a traceable network, including: determining a possible source failure node according to a leaf node that has an exception, wherein the possible source failure node is the node that is most likely to cause the exception; selecting a target node to receive an investigation result corresponding to the target node, wherein the investigation result indicates whether the target node has the same exception as the possible source failure node; receiving the investigation result corresponding to the target node and updating the traceable network according to the investigation result; and returning to the step of determining a possible source failure node, if it can not be verified according to the updated traceable network that the possible source failure node is causing the exception.

According to another aspect of the present invention, the present invention provides a system for finding source failure node in a traceable network, including: a possible source failure node determining module configured to determine a possible source failure node according to a leaf node that has an exception, wherein the possible source failure node is the node that is most likely to cause the exception; a target node selecting module configured to select a target node to receive investigation result corresponding to the target node, wherein the investigation result indicates whether the target node has sad same exception as the possible source failure node; a traceable network updating module configured to receive the investigation result corresponding to the target node and update the traceable network according to the investigation result; and a source failure node verifying module configured to return to the possible source failure node determining module, if it can not be verified according to the updated traceable network that the possible source failure node is causing the exception.

BRIEF DESCRIPTION OF THE SEVERAL VIEWS OF THE DRAWINGS

FIG. 1 (A)-FIG. 1 (C) show examples of a traceable network.

DETAILED DESCRIPTION OF THE PREFERRED EMBODIMENTS

The embodiments of the present invention will be described below with reference to the accompanying drawings. In the below description, many specific details are set forth to understand the invention thoroughly. However, those skilled in the art will appreciate that the invention can be implemented without some of these specific details, and the invention is not limited to the presented specific embodiments. In contrast, the invention can be implemented by using the following features and elements, regardless of whether they relate to different embodiments. Thus, the following aspects, features, embodiments and benefits are illustrative only and should not be considered as elements or definitions of the appended claims, unless otherwise stated therein. It should be noted that only structure means and/or process steps that are closely associated with the invention are shown in the drawings, and other details that do not closely relate to the invention are omitted in order to avoid obscuring the invention by unnecessary details. Furthermore, the connections in this document include both direct connections and indirect connections unless "direct" or "indirect" are explicitly stated.

As described above, information or material flows in one direction in a traceable network, and thus flow direction and the concept of upstream and downstream can be understood. Based on this, definitions of the following terms to be used are given below.

Parent node and child node: in a traceable network, for two nodes that are directly connected, if the direction of product flow is from node A to node B, then node A is a parent node of node B, and node B is a child node of node A.

Ancestor node and descendant node: in a traceable network, for two nodes that are directly or indirectly connected, if the direction of product flow is from node A to node B, then node A is an ancestor node of node B, and node B is a descendant node of node A. Obviously, a parent node is one of the ancestor nodes, and a child node is one of the descendant nodes.

Leaf node: a most downstream node in a set which does not have any child nodes or descendant nodes in that set. As shown in FIG. 1 (C), for the entire traceable network, nodes 15-25 are all leaf nodes. In the following description, a leaf node refers to the leaf node in the whole traceable network unless otherwise specified.

Root node: a most upstream node in a set which does not have any parent nodes or ancestor nodes in that set. As shown in FIG. 1 (C), for the entire traceable network, nodes 1-3 are all root nodes. In the following description, a root node refers to the root node in the whole traceable network unless otherwise specified.

Node distance: if two nodes are directly connected, then the distance is 1; if they are connected indirectly through a third node, then the distance is 2; and so forth.

Level: all nodes that have same distance from a leaf node belong to a same level. All leaf nodes belong to a same level. As shown in FIG. 1 (C), nodes 15-25 belong to the same level, nodes 8-14 belong to the same level, nodes 4-7 belong to the same level, and nodes 1-3 belong to the same level.

Next, the method for finding source failure node according to an embodiment of the invention will be described. As a pre-process, if it can be determined by some means that some nodes in the traceable network do not have an exception or will not have an exception, the traceable network can be updated so that the updated traceable network will not include these nodes. For ease of description, the entire traceable network will be denoted as N in the following.

Figure 2:
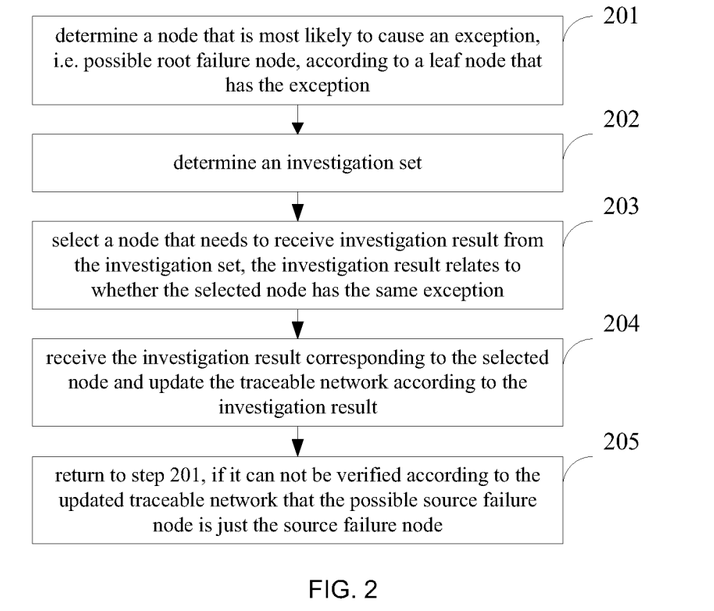
FIG. 2 is a flow diagram of a method for finding a source failure node according to an embodiment of the invention.

In FIG. 2, step 201, a node that is most likely to cause the exception, i.e. a possible source failure node, is determined and denoted as n according to a leaf node o that has an exception.

In the traceable network shown in FIG. 1 (C), N={1, 2, 3, 4, 5, 6, 7, 8, 9, 10, 11, 12, 13, 14, 15, 16, 17, 18, 19, 20, 21, 22, 23, 24, 25}. Assuming leaf node 17 has an exception, then o=17.

Although only one leaf node o is taken as example for description herein, those skilled in the art will appreciate that the method for determining a problem set will not be affected if a plurality of leaf nodes have an exception.

Furthermore, here we assume that the exception occurs at a leaf node. Those skilled in the art will appreciate that, if an exception occurs at a non-leaf node, then it can be concluded that several leaf nodes that are descendant nodes of that non-leaf node will also have the exception, thus they can be processed according to the following flow that there is an exception at a leaf node. Alternatively, that non-leaf node and its descendant nodes can be collapsed into a single node, because that non-leaf node and its descendant nodes will all be affected by the exception. The node resulting from the collapse becomes a leaf node, thus it will be processed according to the following flow that there is an exception at a leaf node. "There is an exception at a leaf node" herein includes the case that it is concluded that there is an exception at a leaf node, and also includes the case that there is an exception at a collapsed node which is equal to a leaf node.

There can be a plurality of nodes that are most likely to cause the found exception. For a plurality of possible source failure nodes, only the processing process for one possible source failure node needs to be repeated. Thus, for the ease of following description, we assume that the possible source failure node n=5.

The possible source failure node can be determined using expert knowledge, history records, a Bayesian network model, or the like. However, those skilled in the art will appreciate that the possible source failure node determined at this stage is only an assumption, regardless of what determining method is used.

In step 202, an investigation set P is determined. According to an embodiment of the invention, the investigation set P includes a possible source failure node n, a descendant node set of the possible source failure node n in the traceable network N, and a parent node set of the possible source failure node n in the traceable network N.

According to another embodiment of the invention, P is determined in the following way: determine a parent node set of node n in the entire traceable network N and denote it with Pa; determine the parent nodes of node n in a problem set Q and a set of nodes that are in a same network level as the parent nodes of node n and denote them with Pb; make Pe=Pa∪Pb; and let P equal to a collection of Pe and its descendant node set in network N. Herein, the problem set Q includes ancestor nodes of the leaf node o in the entire traceable network. In the traceable network N shown in FIG. 1 (C), Q={17, 9, 12, 4, 5, 6, 1, 2, 3}. Obviously, the such determined P includes node n, descendant nodes of node n in the traceable network N, and parent nodes of node n in the traceable network N. Furthermore, let E represent a collection of node n and its descendant nodes in the entire investigation set P.

In the traceable network N shown in FIG. 1 (C), Pa={1, 2}, Pb={1, 2, 3}, Pe=Pa∪Pb={1, 2, 3}, P={1, 2, 3, 4, 5, 6, 7, 8, 9, 10, 11, 12, 13, 14, 15, 16, 17, 18, 19, 20, 21, 22, 23, 24, 25}, and E={5, 9, 10, 15, 16, 17, 18, 19}.

Those skilled in the art may design other ways to determine the investigation set P. In particular, it is also feasible to determine the investigation set P as including all nodes of the traceable network N. In other words, step 202 can be omitted. If step 202 is omitted, the investigation set P can be replaced with the traceable network N.

In step 203, a target node (i.e. a node that needs to receive an investigation result) is selected from the investigation set P, and the investigation result indicates whether the selected node has the same exception.

In step 204, the investigation result corresponding to the selected node is received, and the traceable network N is updated according to the investigation result.

In step 205, return to step 201 if it can not be verified according to the updated traceable network N that the possible source failure node is the desired source failure node.

The update herein mainly refers to two aspects. In one aspect, if the investigation result indicates that some node does not have the same exception, then all ancestor nodes of that node will necessarily not have the same exceptions, thus these nodes that will not have the same exceptions can be excluded from the traceable network N. On the other hand, if the investigation result indicates that some node has the same exception, then it follows that a plurality of leaf nodes o have the exception in step 201.

In an embodiment, the investigation result about whether the leaf nodes in set P have the same exception is preferentially received, and the traceable network N is updated according to the investigation result. This is mainly because the investigation result corresponding to whether the same exception exists can not be obtained at a non-leaf node due to the flow of material or information; receiving investigation results about whether leaf nodes have the same exception may update the traceable network N more efficiently, thereby finding source failure node.

In an embodiment, only the investigation result about whether a part of the leaf nodes in set P have the same exception can be preferentially received. This part of the leaf nodes forms a smallest candidate leaf node set. The amount of information included in the leaf node in the smallest candidate leaf node set is the largest, thereby the source failure node can be found in a fewer number of investigation results.

Next, how to use relationship between nodes in the traceable network N and the investigation result about whether the leaf node in the traceable network N has the same exception to find a source failure node (i.e. the above steps 203-205) will be described in conjunction with various embodiments. In particular, the following detailed embodiment also describes how to determine a smallest candidate leaf node set.

Embodiment 1

If Pe≠ø, i.e. Pe is not a null set, then a source failure node may be found in set P\E (i.e., the part in P other than E).

In step 1-1, a node is selected that needs to receive investigation result Assume that a leaf node set of set P\E is C, and the node that needs to receive an investigation result is selected from C. Obviously, P\E={1, 2, 3, 4, 6, 7, 8, 11, 12, 13, 14, 20, 21, 22, 23, 24, 25} and C={20, 21, 22, 23, 24, 25}.

Various methods can be used to select the node that needs to receive an investigation result from C. According to an embodiment of the invention, an arbitrary leaf node is selected from C as the node that needs to receive an investigation result. According to another embodiment of the invention, the leaf node that has the largest number of corresponding Rc nodes, where Rc nodes are the root nodes of the leaf nodes of set C, is selected from C as the node that needs to receive an investigation result. Such a leaf node has the largest amount of information, because none of the nodes in the corresponding Rc nodes will have the same exception if that leaf node does not have the same exception. Here, the size of the information amount of a node refers to how many nodes that have the same exception can be determinately concluded according to the investigation result corresponding to that node; that is, the number of nodes for which it can be concluded whether it has the same exception according to the investigation result corresponding to that node. An absolute number or a relative number can be used to represent the number of nodes for which it can be concluded whether it has the same exception. Furthermore, a weighting method can be utilized when calculating the number. For example, if node A can conclude whether a first ancestor node in ancestor nodes which has a distance of 1 from node A has the same exception, then the contribution of that first ancestor node to the amount of information of node A is 1; if node A can further conclude whether a second ancestor node in ancestor nodes which has a distance of 2 from node A has the same exception, then the contribution of that second ancestor node to the amount of information of node A is 2. As mentioned before, as a leaf node, if it is found to have the same exception, then this investigation result per se can not be used to determinately conclude that any other nodes have the same exception, with respect to this point, as the amount of information of respective leaf nodes in C is the same. However, if it is found that it does not have the same exception, then this investigation result per se can be used to determinately conclude that all ancestor nodes of that leaf node do not have the same exception. In this embodiment, the leaf node has the largest number of corresponding Rc nodes will have the largest amount of information.

According to yet another embodiment of the invention, a first smallest candidate leaf node set can be constructed, and a node that needs to receive an investigation result can be selected from the first smallest candidate leaf node set. For any node c∈C, let Rc represent its root node set in P\E, obviously, Rc⊂Pe. The first smallest candidate leaf node set satisfies the following condition:

$$\min |L|$$
$$\text{s.t.} \bigcup_{c \in L \subseteq C} R_c = Pe$$

The condition represents that a union set of Rc corresponding to nodes in L covers all nodes in Pe, and the number of nodes in L is the smallest. In the traceable network shown in FIG. 1 (C), $R_{20}=R_{21}=\{1, 2, 3\}$, $R_{22}=R_{23}=R_{24}=R_{25}=\{3\}$, thus L={20} or L={21}.

After obtaining the first smallest candidate leaf node set, any leaf node can be selected from L as a node that needs to receive an investigation result; or the leaf node that has the largest number of corresponding Rc nodes can be selected from L as a node that needs to receive an investigation result. Such a leaf node has the largest amount of information, because all nodes in the corresponding Rc will not have the same exception if that leaf node does not have the same exception. Since in the traceable network shown in FIG. 1 (C), there is only one leaf node in L, that leaf node (i.e. one of nodes 20 or 21) is taken as a node that needs to receive an investigation result.

In step 1-2, after obtaining the node that needs to receive an investigation result, the investigation result on the node that needs to receive an investigation result is received and the traceable network N is updated according to the result.

The investigation result on the node that needs to receive an investigation result has only two possibilities, i.e., with an exception or without an exception. If the result is without an exception, then the investigation result on the nodes in C are continually received.

When continually investigating the nodes in C, similar to the foregoing, any leaf node other than the node that has been investigated can be selected from C as a new node that needs to receive an investigation result; or the leaf node other than the node that has been investigated and which has the largest number of corresponding Rc nodes can be selected from C as a new node that needs to receive an investigation result.

During the process of receiving the investigation result on a node that needs to receive an investigation result in C, it is judged whether any one of the following conditions are satisfied:

(1) All nodes in C are investigated and none of them have an exception.
(2) The investigation shows that some node in C has an exception.

If condition (1) is satisfied, it indicates that the source failure node is not in the set P\E and the process returns to step 201. At this time, not only do none of the nodes in C have an exception, but it can also be concluded that the ancestor nodes of all nodes in C will not have an exception, even though an investigation has not been performed on these ancestor nodes. Since C is a leaf node set of set P\E, none of the nodes in set P\E will have an exception.

If condition (2) is satisfied, according to an embodiment of the invention, the process may return to step 201 after the traceable network N is updated.

If condition (2) is satisfied, according to another embodiment of the invention, it is first judged whether the remaining nodes in C exceed a first threshold; if so, the process returns to step 201 after the traceable network N is updated; if not, an investigation result corresponding to the remaining nodes in C are continually received until an investigation result corresponding to all nodes in C are received, and then the process returns to step 201 after the traceable network N is updated.

If condition (2) is satisfied, according to yet another embodiment of the invention, the investigation result corresponding to the remaining nodes in C are continually received until the investigation result corresponding to all nodes in C are received, and then the process returns to step 201 after the traceable network N is updated.

In the case that the first smallest candidate leaf node set L has been calculated, the process may also be performed on nodes in L rather than all nodes in C, that is, the C described above in the present step are just replaced with L.

If the source failure node is in set P\E, then condition (1) will not be satisfied, and the source failure node will be found after returning several times to step 201.

Embodiment 2

If Pe=, or condition (1) in embodiment 1 is satisfied, then a source failure node can be searched for in set E. If condition (1) in embodiment 1 is satisfied, the result of Pe=, will also be obtained in step 202. Of course, the source failure node may also be searched in set E directly, rather than first searching for the source failure node in set P\E.

In this embodiment, a child node set of node n in the entire traceable network N is determined and is denoted as S; let Sb=S∩Q, Sa=S\Sb, obviously, Sa∩nSb= and Sa∪Sb=S. If Sa≠, then an investigation can be performed on a set formed by Sa and its descendant nodes. The set formed by Sa and its descendant nodes is a subset of set E.

In the traceable network shown in FIG. 1 (C), S={9,10}, Sa={10}, Sb={9}

In step 2-1 a node is selected that needs to receive an investigation result

Let D represent a set of such nodes: the nodes are leaf nodes of set E and the Rd corresponded to the nodes only have a non-null intersection with Sa (i.e. an intersection with Sb is null). For any leaf node d∈D, Rd represents its root node set in E\{n}. The node that needs to receive an investigation result is selected from D, so as to perform an investigation on a set formed by Sa and its descendant nodes. Since E represents a set of node n and its descendant nodes in the entire traceable network N, nodes in Rd are all child nodes of node n, and Rd is a subset of S, while a node in any Rd only belongs to Sa. In the traceable network shown in FIG. 1 (C), D={16, 19}.

Various methods can be used to select a node that needs to receive an investigation result from D. According to an embodiment of the invention, an arbitrary leaf node is selected from D as a node that needs to receive an investigation result. According to another embodiment of the invention, the leaf node that has the largest number of corresponding Rd nodes is selected from D as the node that needs to receive an investigation result. Such a leaf node has the largest amount of information, because none of the nodes in the corresponding Rd will have the same exception if that leaf node does not have the same exception.

According to yet another embodiment of the invention, a second smallest candidate leaf node set M can be constructed, and the node that needs to receive an investigation result can be selected from that second smallest candidate leaf node set M. That candidate set satisfies the following condition:

$$\min |M|$$
$$\text{s.t.} \bigcup_{d \in M \subseteq D} Rd = Sa$$

The condition represents that a union set of Rd corresponding to nodes in M covers all nodes in Sa, and the number of nodes in M is the smallest. In the traceable network shown in FIG. 1 (C), $R_{16}=\{10\}$, $R_{19}=\{10\}$, thus M={16} or M={19}.

After obtaining the second smallest candidate leaf node set, any leaf node can be selected from M as a node that needs to receive an investigation result; or the leaf node that has the largest number of corresponding Rd nodes can be selected from M as the node that needs to receive an investigation result. Such a leaf node has the largest amount of information, because none of the nodes in the corresponding Rd will have the same exception if that leaf node does not have the same exception.

In step 2-2, after obtaining a node that needs to receive an investigation result, the investigation result on the node that needs to receive the investigation result is received and the traceable network N is updated according to the result.

The investigation result on the node that needs to receive an investigation result has only two possibilities, i.e., with an exception or without an exception. If the result is without an exception, then the investigation results on a node in D are continually received.

When continually investigating nodes in D, similar to the foregoing, any leaf node other than the node that has been investigated can be selected from D as a new node that needs to receive an investigation result; or the leaf node other than the node that has been investigated and which has the largest number of corresponding Rd nodes can be selected from D as a new node that needs to receive an investigation result.

During the process of receiving the investigation result on the node that needs to receive an investigation result in D, it is judged whether any one of the following conditions are satisfied:
(3) All leaf nodes in D are investigated and none of them have an exception.
(4) The investigation shows that some leaf node in D has an exception.

If condition (3) is satisfied, it indicates that the source failure node is not in the set formed by Sa and its descendant nodes and the process returns to step 201. At this time, not only do none of the nodes in D have an exception, but also it can be concluded that the ancestor nodes of all nodes in D will not have an exception, although an investigation has not been performed on these ancestor nodes. In other words, the set formed by Sa and its descendant nodes will not have an exception.

If condition (4) is satisfied, according to an embodiment of the invention, the process may return to step 201 after the traceable network N is updated.

If condition (4) is satisfied, according to another embodiment of the invention, it is first judged whether the remaining nodes in D exceed a second threshold, if so, the process may return to step 201 after the traceable network N is updated; if not, an investigation result corresponding to the remaining nodes in D are continually received, until the investigation result corresponding to all nodes in D are received, and then the process may return to step 201 after the traceable network N is updated.

If condition (4) is satisfied, according to yet another embodiment of the invention, the investigation result corresponding to the remaining nodes in D are continually received until the investigation result corresponding to all nodes in D are received, and then the process may return to step 201 after the traceable network N is updated.

In the case that the second smallest candidate leaf node set M has been calculated, the process may also be performed on nodes in M rather than all nodes in D, that is, the D described above in the present step are replaced with M.

If the source failure node is in the set formed by Sa and its descendant nodes, then condition (3) will not be satisfied, and the source failure node will be found after returning several times to step 201.

Embodiment 3

As described above, if Pe=, or condition (1) in embodiment 1 is satisfied, then an investigation can be performed on set E. If condition (1) in embodiment 1 is satisfied, the result of Pe=will also be obtained in step 202. Of course, an investigation may also be directly performed on set E without performing an investigation on set P\E.

Embodiment 2 describes that a subset of set E, that is, a set formed by Sa and its descendant nodes, is investigated in case that Sa≠.

If Sa=, or condition (3) in embodiment 2 is satisfied, then an investigation still can be performed on the subset formed by Sb and its descendant nodes in set E. If condition (2) in embodiment 2 is satisfied, then in the updated traceable network N, there will necessarily be Sa=. Thus, Sa= is equivalent to condition (3) in embodiment 2 being satisfied. Of course, an investigation may also be directly performed on a subset formed by Sb and its descendant nodes without performing an investigation on the subset formed by Sa and its descendant nodes.

In step 3-1, a node is selected that needs to receive an investigation result.

Let F represent a set of such nodes: the nodes are leaf nodes of set E, and Rf corresponding to the nodes only have a non-null intersection with Sb (i.e. an intersection with Sa is null). For any leaf node f∈F, Rf represents its root node set in E\{n}. The node that needs to receive investigation result is selected from F, so as to perform an investigation on a set formed by Sb and its descendant nodes. Since E represents a set of node n and its descendant nodes in the entire traceable network N, nodes in Rf are all child nodes of node n, and Rf is a subset of S, while a node in any Rf only belongs to Sb. In the traceable network shown in FIG. 1 (C), F={15, 17}.

Various methods can be used to select a node that needs to receive an investigation result from F. According to an embodiment of the invention, an arbitrary leaf node is selected from F as a node that needs to receive an investigation result. According to another embodiment of the invention, the leaf node that has the largest number of corresponding Rf nodes is selected from F as the node that needs to receive an investigation result. Such a leaf node has the largest amount of information, because none of the nodes in the corresponding Rf will have the same exception if that leaf node does not have the same exception.

According to yet another embodiment of the invention, a third smallest candidate leaf node set K can be constructed, and the node that needs to receive an investigation result can be selected from that third smallest candidate leaf node set K. That candidate set K satisfies the following condition:

$$\min |K|$$
$$\text{s.t.} \bigcup_{f \in K \subseteq F} Rf = Sb$$

The condition represents that a union set of Rf corresponding to nodes in K covers all nodes in Sb, and the number of nodes in K is the smallest. In the traceable network shown in FIG. 1 (C), $R_{15}=\{9\}$, $R_{17}=\{9\}$, and since node 17 is a node having an exception, K={15}.

After obtaining the third smallest candidate leaf node set, any leaf node can be selected from K as a node that needs to receive an investigation result; or the leaf node that has the largest number of corresponding Rf nodes can be selected from K as the node that needs to receive an investigation result. Such a leaf node has the largest amount of information, because none of the nodes in the corresponding Rf will have the same exception if that leaf node does not have the same exception.

In step 3-2, after obtaining a node that needs to receive an investigation result, the investigation result on the node that needs to receive an investigation result is received and the traceable network N is updated according to the result.

The investigation result on the node that needs to receive an investigation result has only two possibilities, i.e., with an exception or without an exception. If the result is without an exception, then the investigation result on a node in F is continually received.

When continually investigating on a node in F, similar to the foregoing, any leaf node other than the node that has been investigated can be selected from F as a new node that needs to receive an investigation result; or the leaf node other than the node that has been investigated and which has the largest number of corresponding Rf nodes can be selected from F as a new node that needs to receive an investigation result.

During the process of receiving the investigation result on the node that needs to receive an investigation result in F, it is judged whether any one of the following conditions are satisfied:

(5) All leaf nodes in F are investigated and none of them have an exception.

(6) The investigation shows that some leaf node in F has an exception.

If condition (5) is satisfied, it indicates that the source failure node is not in the set formed by Sb and its descendant nodes and the process returns to step 201. At this time, not only do none of the nodes in F have an exception, but also it can be concluded that the ancestor nodes of all nodes in F will not have an exception, although an investigation has not been performed on these ancestor nodes. In other words, the set formed by Sb and its descendant nodes will not have an exception. It should be particularly pointed out that here the set formed by Sb and its descendant nodes does not include the node o that has an exception.

If condition (6) is satisfied, according to an embodiment of the invention, the process may return to step 201 after the traceable network N is updated.

If condition (6) is satisfied, according to another embodiment of the invention, it is first judged whether the remaining nodes in F exceed a third threshold, if so, the process may return to step 201 after the traceable network N is updated; if not, investigation results corresponding to the remaining nodes in F are continually received, until the investigation result corresponding to all nodes in F are received, and then the process may return to step 201 after the traceable network N is updated.

If condition (6) is satisfied, according to yet another embodiment of the invention, the investigation result corresponding to the remaining nodes in F are continually received until the investigation result corresponding to all nodes in F are received, and then the process may return to step 201 after the traceable network N is updated.

In the case that the third smallest candidate leaf node set K has been calculated, the process may also be performed on nodes in K rather than all nodes in F, that is, the F described above in the present step are replaced with K.

If the source failure node is in the set formed by Sb and its descendant nodes, then condition (5) will not be satisfied, and the source failure node will be found after returning several times to step 201.

Three detailed embodiments of finding a source failure node by using relationships between nodes in a traceable network N and an investigation result about whether child nodes in set P have the same exception are described above. Preferably, the source failure node is first searched in set P\E, and then the source failure node is searched in a set formed by Sa and its descendant nodes, and finally the source failure node is searched in a set formed by Sb and its descendant nodes. The average number of investigation results corresponding to finding the source failure node in this order is the smallest. This is because, in the order of: set P\E, a set formed by Sa and its descendant nodes, and a set formed by Sb and its descendant nodes, the possibility of finding the same exception at leaf node increases gradually. It can be determined that all ancestor nodes of a leaf node do not have same exception if that leaf node does not have the same exception. That is, the amount of information contained in a leaf node that does not have the same exception is more than the amount of information contained in a leaf node that has the same exception, so it is desirable to find the leaf node that does not have the same exception as soon as possible.

Figure 3:
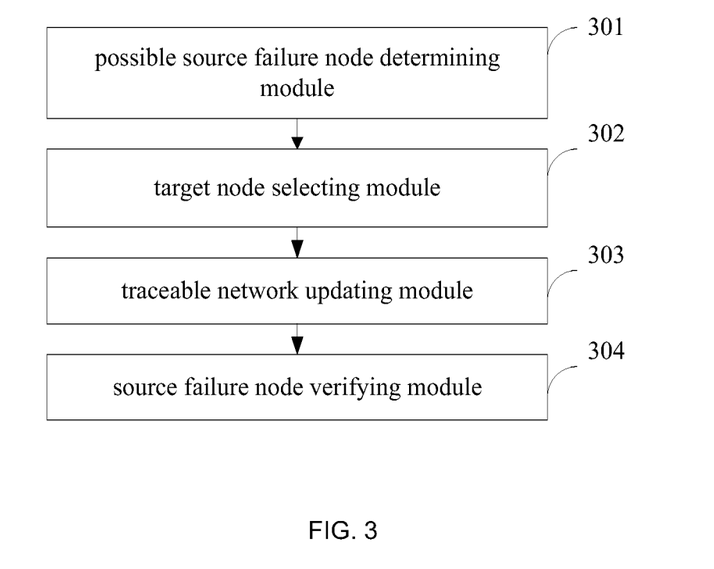
FIG. 3 is a block diagram of a system for finding a source failure node according to an embodiment of the invention.

The following refers to FIG. 3, which is a block diagram of a system for finding source failure node in a traceable network according to an embodiment of the invention.

The possible source failure node determining module 301 is configured to determine possible source failure node according to a leaf node that has an exception, wherein the possible source failure node is a node that is most likely to cause the exception.

The target node selecting module 302 is configured to select a target node, wherein for the target node, an investigation result that indicates whether the target node has the same exception needs to be received.

The traceable network updating module 303 is configured to receive the investigation result corresponding to the target node and update the traceable network according to the investigation result.

The source failure node verifying module 304 is configured to return to the possible source failure node determining module, if it can not be verified according to the updated traceable network that the possible source failure node is the desired source failure node.

A person skilled in the art will appreciate that the above method and system can be implemented by using computer executable instructions and/or control code contained in a processor, for example, such code is provided on carrier medium such as a magnetic disk, CD or DVD-ROM, programmable memory such as read-only memory (firmware) or data carrier such as optical or electrical signal carrier. The system of the embodiment for controlling energy consumption of a mobile device and respective components thereof can be implemented by hardware circuit such as a large scale integrated circuit or gate arrays, semiconductors such as logic chip or transistors, or programmable hardware devices such as field programmable gate array, programmable logic device, or can be implemented in form of various processors executing corresponding software, or can be implemented by a combination of the above hardware circuit and software such as firmware.

Although several exemplary embodiments of the invention have been illustrated and described, those skilled in the art will appreciate that these embodiments can be changed without departing from the spirit and scope of the invention. The scope of the invention is defined by the appended claims and their equivalent transformations.

What is claimed is:

1. A method for finding a source failure node in a traceable network, comprising:
   determining a possible source failure node according to a leaf node that has an exception, wherein said possible source failure node is the node that is most likely to cause said exception;
   calculating a minimum candidate leaf node set, wherein the calculating comprises determining a node set that satisfies a condition selected from the group of $$s.t \bigcup_{c \in L \subseteq C}^{min[L]} R_c = P_e, s.t \bigcup_{d \in M \subseteq D}^{min[M]} Rd = Sa, \text{ and } s.t \bigcup_{f \in K \subseteq F}^{min[K]} Rf = Sb;$$

selecting a leaf node in said minimum candidate leaf node set as a target node to receive an investigation result corresponding to said target node, wherein said investigation result indicates whether said target node has said same exception as said possible source failure node;
   receiving said investigation result corresponding to said target node and updating said traceable network according to said investigation result; and
   returning to said step of determining a possible source failure node, if it can not be verified according to said updated traceable network that said possible source failure node is causing said exception.

2. The method according to claim 1, wherein selecting said target node comprises:
   determining an investigation set, wherein said investigation set comprises a descendant node set of said parent node of said possible source failure node in said traceable network, and a set of nodes in a problem set and in a same network level as said parent node of said possible source failure node and its descendant node set in said traceable network, wherein said problem set comprises ancestor nodes of said leaf node that has said exception in said traceable network.

3. The method according to claim 1, wherein receiving said investigation result corresponding to said target node and updating said traceable network according to said investigation result comprises:
- judging whether the number of remaining target nodes that have not received said corresponding investigation results exceed a threshold in response to receiving said investigation result that indicates some target node has said same exception as said possible source failure node;
- updating said traceable network according to said investigation result if said threshold is exceeded; and
- continually receiving said investigation results corresponding to said remaining target nodes if said threshold is not exceeded, until said investigation results corresponding to all target nodes are received, and then updating said traceable network according to said investigation results.

4. The method according to claim 1, wherein receiving said investigation result corresponding to said target node and updating said traceable network according to said investigation result comprises:
- updating said traceable network according to said investigation result after receiving said investigation result corresponding to all target nodes.

5. The method according to claim 1, wherein receiving said investigation result corresponding to said target node and updating said traceable network according to said investigation result comprises:
- updating said traceable network according to said investigation result, in response to receiving an investigation result that indicates some target node has said same exception as said possible source failure node.

6. The method according to claim 1, wherein receiving said investigation result corresponding to said target node and updating said traceable network according to said investigation result comprises:
- preferentially receiving said investigation result corresponding to a node among said target nodes that is less likely to have said same exception as said possible source failure node.

7. The method according to claim 1, wherein receiving said investigation result corresponding to said target node and updating said traceable network according to said investigation result comprises:
- preferentially receiving said investigation result corresponding to a node in said target nodes that have a larger amount of information, wherein said amount of information of said node represents the number of nodes for which it can be concluded whether they have said same exception as said possible source failure node according to said investigation result corresponding to that node.

8. A system for finding a source failure node in a traceable network, comprising:
- a possible source failure node determining module configured to determine a possible source failure node according to a leaf node that has an exception, wherein said possible source failure node is the node that is most likely to cause said exception;
- a target node selecting module configured to select a target node to receive an investigation result corresponding to said target node, wherein said investigation result indicates whether said target node has said same exception as said possible source failure node and wherein said target node selecting module comprises means configured to calculate a minimum candidate leaf node set and select said leaf node in said minimum candidate leaf node set as said target node, wherein the minimum candidate leaf node set is calculated by determining a node set that satisfies a condition selected from the group of $$s.t \bigcup_{c \in L \subseteq C}^{min[L]} R_c = P_e, \ s.t \bigcup_{d \in M \subseteq D}^{min[M]} Rd = Sa, \text{ and } s.t \bigcup_{f \in K \subseteq F}^{min[K]} Rf = Sb;$$

- a traceable network updating module configured to receive said investigation result corresponding to said target node and update said traceable network according to said investigation result; and
- a source failure node verifying module configured to return to said possible source failure node determining module, if it can not be verified according to said updated traceable network that said possible source failure node is causing said exception.

9. The system according to claim 8, wherein said target node selecting module comprises:
- means configured to determine an investigation set, wherein said investigation set comprises a descendant node set of said parent node of said possible source failure node in said traceable network, and a set of nodes in a problem set and in a same network level as said parent node of said possible source failure node and its descendant node set in said traceable network, wherein said problem set comprises ancestor nodes of said leaf node that has said exception in said traceable network.

10. The system according to claim 8, wherein said traceable network updating module comprises:
- means configured to judge whether the number of remaining target nodes that have not received said corresponding investigation results exceed a threshold in response to receiving an investigation result that indicates some target node has said same exception as said possible source failure node;
- means configured to update said traceable network according to said investigation results if said threshold is exceeded; and
- means configured to continually receive said investigation results corresponding to said remaining target nodes if said threshold is not exceeded, until said investigation result corresponding to all target nodes are received, and then update said traceable network according to said investigation result.

11. The system according to claim 8, wherein said traceable network updating module comprises:
- means configured to update said traceable network according to said investigation result after receiving said investigation result corresponding to all target nodes so as to predetermine said possible source failure node.

12. The system according to claim 8, wherein said traceable network updating module comprises:
- means configured to, in response to receiving an investigation result that indicates some target node has said same exception as said possible source failure node, update said traceable network according to said investigation result.

13. The system according to claim 8, wherein said traceable network updating module comprises:
- means configured to preferentially receive said investigation result corresponding to a node among said target nodes that is less likely to have said same exception as said possible source failure node.

14. The system according to claim 8, wherein said traceable network updating module comprises:

means configured to preferentially receive said investigation result corresponding to a node among said target nodes that has a larger amount of information, wherein said amount of information of said node represents said number of nodes for which it can be concluded whether they have said same exception as said source failure node according to said investigation result corresponding to that node.

* * * * *